United States Patent
Bouskila et al.

(10) Patent No.: US 11,979,940 B2
(45) Date of Patent: May 7, 2024

(54) SYSTEM AND METHOD FOR PROVISIONING ENHANCED SIM PROFILES AS STANDARD eUICC PROFILES

(71) Applicant: Flo Live Israel Ltd., Bnei Brak (IL)

(72) Inventors: Oren Bouskila, Yad Nathan (IL); Eran Dotan Rosenberg, Herzliya (IL)

(73) Assignee: FLO LIVE ISRAEL LTD., Bnei Brak (IL)

( * ) Notice: Subject to any disclaimer, the term of this patent is extended or adjusted under 35 U.S.C. 154(b) by 104 days.

(21) Appl. No.: 17/500,532

(22) Filed: Oct. 13, 2021

(65) Prior Publication Data

US 2022/0116763 A1    Apr. 14, 2022

Related U.S. Application Data

(60) Provisional application No. 63/091,587, filed on Oct. 14, 2020.

(51) Int. Cl.
*H04W 8/18* (2009.01)
*H04W 8/26* (2009.01)
*H04W 76/10* (2018.01)
*H04L 101/654* (2022.01)

(52) U.S. Cl.
CPC ............ *H04W 8/183* (2013.01); *H04W 8/26* (2013.01); *H04W 76/10* (2018.02); *H04L 2101/654* (2022.05)

(58) Field of Classification Search
CPC ....... H04W 8/183; H04W 76/10; H04W 8/26; H04L 2101/654
USPC ........................................................ 370/329
See application file for complete search history.

(56) References Cited

U.S. PATENT DOCUMENTS

| | | | | |
|---|---|---|---|---|
| 2011/0193718 A1* | 8/2011 | Chevrette | ............ | H04W 48/18 340/870.02 |
| 2012/0108204 A1* | 5/2012 | Schell | .................. | H04W 12/35 455/411 |
| 2012/0309374 A1* | 12/2012 | Tagg | ....................... | H04W 8/26 455/418 |

(Continued)

FOREIGN PATENT DOCUMENTS

EP    3035724 A1    6/2016

OTHER PUBLICATIONS

GSM Association. "Remote Provisioning Architecture for Embedded UICC Technical Specification". May 27, 2016.

(Continued)

*Primary Examiner* — Mark G. Pannell
(74) *Attorney, Agent, or Firm* — M&B IP Analysts, LLC (57) ABSTRACT

A method and system for provisioning an embedded SIM (eSIM) with an enhanced SIM profile are provided. The method includes creating an eSIM card with a single enhanced SIM profile on a connected device, wherein the created eSIM includes at least an applet; initiating a subscription management data exchange between the eSIM card and various components of a cellular network; initiating a bootstrap control of the applet to restart the eSIM; and configuring the eSIM with the plurality of multi-international mobile subscriber identity (multi-IMSI) profiles and actions related to IMSI profiles, wherein the configuration is performed using over-the-air (OTA) configuration, thereby configuring the enhanced SIM profile with plurality IMSI profiles.

21 Claims, 5 Drawing Sheets

(56) References Cited

U.S. PATENT DOCUMENTS

| | | | |
|---|---|---|---|
| 2013/0072257 A1* | 3/2013 | Evans | H04B 1/3816 455/558 |
| 2013/0165073 A1* | 6/2013 | Madsen | H04W 12/06 455/411 |
| 2014/0045460 A1* | 2/2014 | Park | H04W 12/35 455/418 |
| 2014/0099916 A1* | 4/2014 | Mallikarjunan | H04W 8/20 455/406 |
| 2014/0134981 A1* | 5/2014 | Park | H04W 12/40 455/411 |
| 2014/0143826 A1* | 5/2014 | Sharp | G06F 21/604 726/1 |
| 2014/0228039 A1* | 8/2014 | Zhao | H04B 1/3816 455/458 |
| 2014/0273913 A1* | 9/2014 | Michel | H04W 4/44 455/404.1 |
| 2014/0308991 A1* | 10/2014 | Lee | H04W 12/35 455/558 |
| 2015/0237496 A1* | 8/2015 | Gao | H04B 1/3816 455/414.1 |
| 2015/0237551 A1* | 8/2015 | Jin | H04W 8/183 370/331 |
| 2015/0350878 A1* | 12/2015 | Li | H04W 8/183 455/558 |
| 2016/0006728 A1* | 1/2016 | Park | H04W 12/06 455/411 |
| 2016/0020803 A1* | 1/2016 | Cha | H04W 76/10 455/558 |
| 2016/0094930 A1* | 3/2016 | Ramanna | H04B 1/3816 455/558 |
| 2016/0119780 A1* | 4/2016 | Jung | H04W 8/205 455/419 |
| 2016/0157085 A1* | 6/2016 | Yeoum | H04L 67/306 455/435.1 |
| 2016/0295544 A1* | 10/2016 | Jiang | H04W 12/35 |
| 2017/0093458 A1* | 3/2017 | Rafique | H04B 1/68 |
| 2017/0208540 A1* | 7/2017 | Egner | H04W 64/003 |
| 2017/0332312 A1* | 11/2017 | Jung | H04W 60/00 |
| 2018/0004736 A1* | 1/2018 | Zhao | H04B 1/38 |
| 2019/0007826 A1* | 1/2019 | Wane | H04M 15/8038 |
| 2019/0159016 A1* | 5/2019 | Zhang | H04W 8/183 |
| 2019/0268755 A1* | 8/2019 | Namiranian | H04W 8/183 |
| 2019/0281442 A1* | 9/2019 | Kim | H04W 48/16 |
| 2019/0318127 A1* | 10/2019 | Pan | G06F 21/60 |
| 2020/0037153 A1* | 1/2020 | Anand | H04M 1/72454 |
| 2021/0227395 A1* | 7/2021 | Bretagne | H04W 8/205 |
| 2021/0250750 A1* | 8/2021 | Higgins | H04W 8/183 |
| 2021/0368326 A1* | 11/2021 | Strand | H04W 88/06 |
| 2022/0225083 A1* | 7/2022 | Borisoglebski | H04W 8/183 |
| 2022/0286390 A1* | 9/2022 | Tyagi | H04L 45/507 |
| 2022/0386105 A1* | 12/2022 | Jung | H04W 12/45 |

OTHER PUBLICATIONS

GSMA. "eSIM Whitepaper: The what and how of Remote SIM Provisioning". Mar. 2018.

* cited by examiner

SYSTEM AND METHOD FOR PROVISIONING ENHANCED SIM PROFILES AS STANDARD eUICC PROFILES

CROSS-REFERENCE TO RELATED APPLICATIONS

This application claims the benefit of U.S. Provisional Application No. 63/091,587, filed on Oct. 14, 2020, the contents of which are hereby incorporated by reference.

TECHNICAL FIELD

The present disclosure relates generally to provisioning of embedded Universal Integrated Circuit Cards (eUICCs) and, more particularly, to provisioning of eUICCs with multiple different profiles.

BACKGROUND

Recently, Internet-of-Things (IoT) devices have become increasingly popular among tech manufacturers, as well as with consumers. IoT devices include physical devices and everyday objects that are configured to connect to a network, such as the Internet, allowing the devices to perform advanced functions using network connectivity. IoT devices may include an array of appliances, ranging from refrigerators and microwaves to security cameras and thermostats. Many such devices are designed to be connected to home or work wireless internet networks, using a wireless router or access point to connect to the Internet. This setup is often convenient and cost-friendly, as many IoT devices are used within the range of a standard network.

However, many devices that can benefit from IoT connectivity are located beyond the range of routers or access points. One method of offering the same connectivity is to use cellular networks. For example, devices used in the field may employ a subscriber identity module (SIM) card to connect to a modern Global System for a Mobile Communications (GSM) network, a Long-Term Evolution (LTE) network, and the like. A SIM card is a secure element integrated circuit (IC) board card that allows a network to identify the connected device to grant network access and authenticate subscribers. Using this model, when a subscriber wishes to switch from one service provider to another, a second SIM card should be obtained and swapped out for a first card, thus registering a device on a new network.

Recently, various standard groups have introduced a new evolution of SIM cards where a physical card is not required, but rather where the same SIM credentials are downloaded directly to a device stored therein. This is referred to as an embedded SIM (eSIM) card, an iSIM, or eUICC (collectively referred to as "eSIM"). An eSIM offers users the ability to change the service provider over-the-air (OTA), without needing to physically change the embedded SIM card itself. That is, no physical replacement needs to take place to transfer from a first to a second network, but rather, new software or profile information is downloaded onto a device to configure the device to connect to a new provider. This is referred to as SIM provisioning.

One challenge with manufacturing IoT devices for use with an eSIM or SIM card is that such devices are often intended to be sold and used in various locations, where using a single SIM credential, or profile, is insufficient. A profile includes an international mobile subscriber identity (IMSI) of a cellular carrier and used to connect to the respective cellular network.

Currently, every eSIM is configured with a single profile, that is, with a single network IMSI. The eSIM card credentials are downloaded at the place of manufacture or by a later vendor, and the ability to adapt and connect to multiple or shifting networks may be required for optimal coverage. Additionally, having to manually swap SIM cards or even connect to a network to download eSIM credentials can be inefficient and potentially difficult when used in remote and hard-to-reach locations. For example, if a weather station, configured to be connected via an eSIM, is manufactured for one SIM-compatible region, and is installed in a second region in a remote part of a forest, it may take time, money, and manpower to update or change the SIM credentials, or any settings or profiles connected thereto, if physical access to the device is required.

In addition to the deficiencies noted with respect to switching physical SIM cards or downloading new SIM profiles, the execution of eSIM upload and switch methods fails to provide for cost, data, power, and time savings. In certain solutions, eSIM upload and switch methods may be prohibitively expensive for certain device operators, with mobile network operators (MNOs) charging eSIM switch fees on a per-switch basis. Further, upload and switch solutions may include excessive bandwidth or data-usage requirements, with eSIM profile uploads consuming both SMS and data allocations. Next, upload and switch solutions may require significant power consumption on the part of the switching devices, potentially reducing the lifecycle of internet of things (IoT) devices. In addition, upload and switch solutions may require comparatively-long switching cycle lengths, during which a switched device may be unavailable for execution of other processes, causing delays which, when compounded, may result in significant operation losses.

Another challenge in the manufacture of IoT devices is that the manufacturer may have no knowledge of where the IoT devices will eventually be deployed, as the activation of a device occurs after manufacturing. As such, the provisioning of each device with a per-allocated active SIM maybe cost-inefficient.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for provisioning an embedded SIM (eSIM) with an enhanced SIM profile. The method includes creating an eSIM card with a single enhanced SIM profile on a connected device, wherein the created eSIM includes at least an applet; initiating a subscription management data exchange between the eSIM card and various components of a cellular network; initiating a bootstrap control of the applet to restart the eSIM; and configuring the eSIM with the plurality of multi-international mobile subscriber identity (multi-IMSI) profiles and actions related to IMSI profiles, wherein the configuration is performed using over-the-air (OTA) configuration, thereby configuring the enhanced SIM profile with plurality IMSI profiles.

Certain embodiments disclosed herein also include a system for provisioning an embedded SIM (eSIM) with an enhanced SIM profile. The system includes a processing circuitry; and a memory, the memory containing instructions that, when executed by the processing circuitry, configure the system to: create an eSIM card with a single enhanced SIM profile on a connected device, wherein the created eSIM includes at least an applet; initiate a subscription management data exchange between the eSIM card and various components of a cellular network; initiate a bootstrap control of the applet to restart the eSIM; and configure the eSIM with the plurality of multi-international mobile subscriber identity (multi-IMSI) profiles and actions related to IMSI profiles, wherein the configuration is performed using over-the-air (OTA) configuration, thereby configuring the enhanced SIM profile with a plurality IMS) profiles.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to some example embodiments, eSIM initialization, including IMSI selection and timer expiration processes, are disclosed. In an embodiment, eSIM initialization includes remote SIM provisioning, which allows consumers, as well as service providers, to remotely activate an eSIM in a device to update various profile and location data features. This initialization is crucial for devices that are manufactured to be deployed in various regions where the profiles must be updated to configure a device to connect to a local provider's network.

In some embodiments, a device without a profile loaded and enabled may use a number of alternative methods to download a profile. These include using a special purpose 'Provisioning Profile,' also referred to as a bootstrap or fallback, to connect to a cellular network for both consumer and machine-to-machine (M2M) solutions. Once this local connection is established, the eSIM initialization may continue, and an updated profile for local use can be installed and configured.

Figure 1:
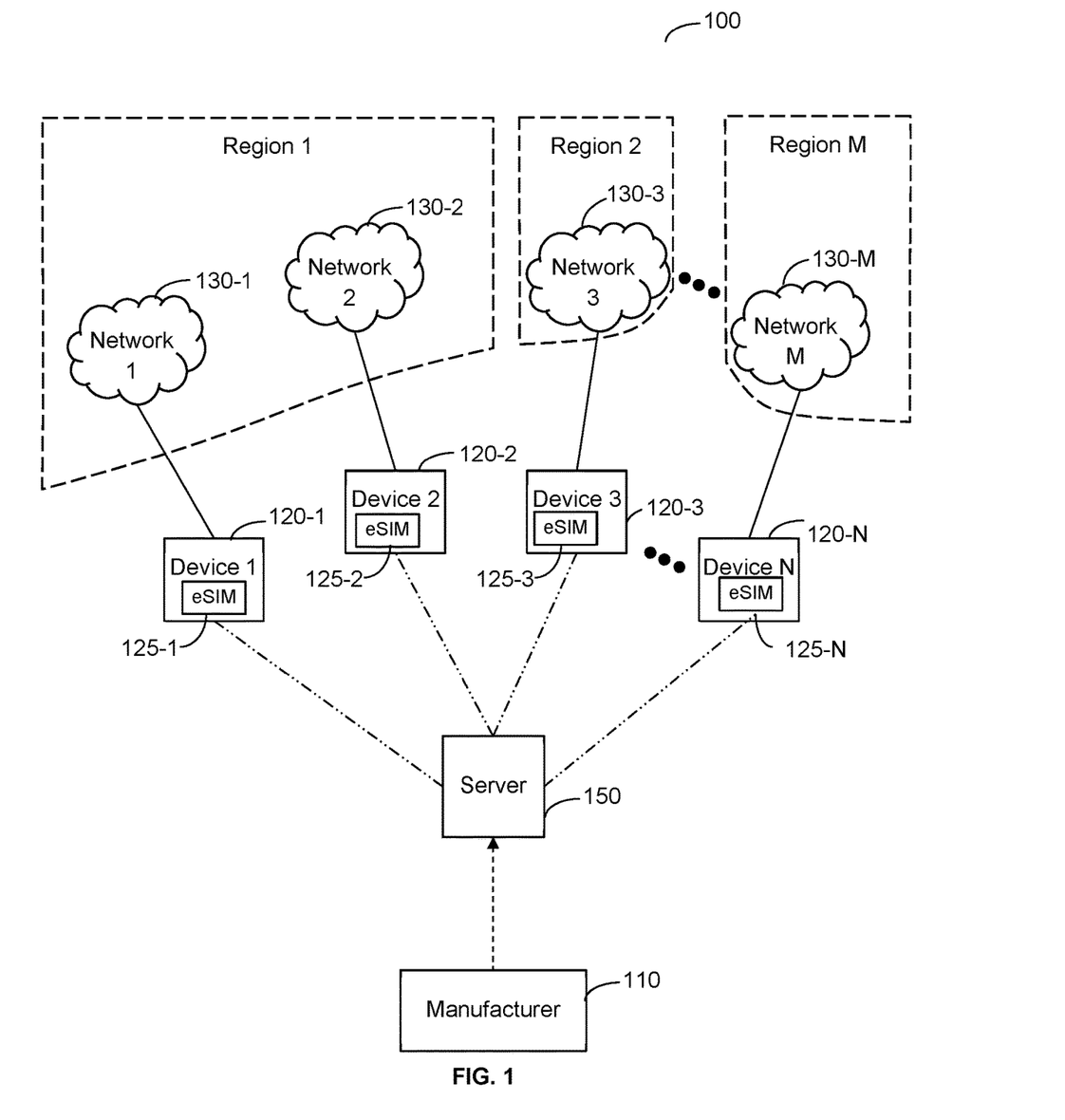
FIG. 1 is a block diagram showing an example distribution model of multi-international mobile subscriber identifier (IMSI) SIM devices.

FIG. 1 is an example block diagram showing an example distribution model 100 of multi-IMSI SIM devices. In many cases, a single manufacturer 110 designs and produces many devices 120-1 to 120-$n$ requiring an eSIM 125-1 to 125-$n$ respectively, where 'n' is an integer equal to or greater than 1, for use in multiple end destinations. These destinations have cellular networks 130-1 to 130-$m$, where cm' is an integer equal to or greater than 1, that will be used to provide connectivity to the devices 120. The cellular networks 130 may include LTE networks, GSM networks, 3G networks, 5G networks, and the like. A device 120 may include an IoT device, a mobile device, a cellular device, a wearable device, or any electronic device that requires a connection to a cellular network.

In one embodiment, the manufacturer 110 produces devices 120 to be used in multiple destinations, where the destinations include more than one network region. Network regions are regions that use a particular set of network parameters to connect devices to local networks. Regions differ throughout the world, and a device 120 configured to operate within one region will often not be configured to communicate on networks within another region. Further, it may not be practical or feasible to preprogram each and every device 120 with the exact parameters needed to connect to, and work with, every potential network, as the manufacturer 110 may not know a device's destination. Further, a manufacturer 110 may not control where the device is finally located, as the device may be resold or moved from an intended destination, to an unintended one.

For example, devices 1 and 2, 120-1 and 120-2, respectively, may be destined for use with networks 130-1 and 130-2, which are both located within region 1. In an embodiment, region 1 is a common end destination for devices manufactured by the manufacturer 110 and, therefore, each of those devices may be configured with SIM parameters configured within eSIM 125-1 and 125-2, respectively, which provide for connectivity within region 1. However, region 2 may be an uncommon region for devices 120 made by the manufacturer 110 and, thus, parameters for using a device, such as device 120-3, within region 2 may not be stored within device 120-3.

According to an embodiment, all devices 120 manufactured by the manufacturer 110 include one profile configured within the eSIM of each device 120. Such a profile defines network parameters to communicate through global roaming, so as to allow connection to a central server 150 from any region. If a device, such as device 120-3, is located within a region and lacks a profile for communication with networks within that region, the device 120-3 is configured to connect to the central server 150, to download all the relevant profiles, and to reconfigure its settings for connection to the local network. The connection between a device 120 and the central server 150 is over an unstructured supplementary service data (USSD) channel, a cellular data channel, one or more SMS messages, and the like, as well as any combination thereof.

By way of example, and without limitation, if a manufacturer 110 mainly exports devices 120 to China and the U.S.A., all of its manufactured devices, 120-1 through 120-n, may be programmed with eSIM profiles that include network parameters for connecting to networks 130 within those regions. Upon initialization within such regions, such as region 1, each device 120 is ready to function normally. However, if a device, such as device 120-3, is initialized in a region that is a less common end destination, such as Italy, the device, 120-3, would lack the proper network parameters required to connect with an Italian cellular network, such as network 3.

In the same example, to remedy such a lack of proper network provisioning parameters, according to an embodiment, the device, such as device 120-3, is configured to create a temporary connection to the central server 150, and then to download a local eSIM profile, including network parameters for connecting to an Italian network, such as network 130-3. The device 120-3 is further configured to activate the local eSIM profile on the device, thereby providing for a permanent and reliable connection going forward. In an embodiment, the initial temporary connection and relaying of network parameters may be executed over USSD, cellular data channels, SMS messaging protocols, and the like, as well as any combination thereof.

In another embodiment, a profile can be configured with a multi-range bootstrap international mobile subscriber identity (IMSI). A multi-range bootstrap IMSI (or a fallback IMSI) is a mechanism that allows a large number of devices to be manufactured with one identical configuration of eSIM (or SIM). That is, the same, identical, eSIM may have the same SIM profile settings and the same set of bootstrap IMSI ranges. A bootstrap IMSI range is defined as a range of IMSIs, such as a number, 'N,' of consecutive IMSIs, where 'N' is an integer number. The same range can used by a different number, 'M,' of devices 120, where 'M' is an integer number. It should be noted that 'M' is a greater number than 'N.' For example, one million devices may use a similar SIM setting, and each SIM can hold a single range of 1000 bootstrap IMSIs. An IMSI is a unique number, usually fifteen digits, associated with Global System for Mobile Communications (GSM) and Universal Mobile Telecommunications System (UMTS) network mobile phone users. The IMSI is a unique number identifying a GSM subscriber.

According to an embodiment, each time a device 120 is required to use a bootstrap IMSI, an applet is installed in the respective eSIM 125. Such an applet (or any piece of executable code) is configured to allocate a single bootstrap IMSI, out of the existing range, in order to allow a device 120 to connect to the cellular network. In an embodiment, the eSIM applet is further configured to handle the best-optimized IMSI allocation out of the predefined range. Statistically, a device 120 would require activating a profile with a bootstrap IMSI for a very short time period, only allowing the device a first connection to the server 150.

In an embodiment, when a plurality of devices 120 attempt to connect to the network 130 with the same allocated bootstrap IMSI, the central server 150 is configured to allow only a first device to register, where all other devices would be rejected from registration to a network 130. That is, one device assigned with a bootstrap IMSI can be connected to the cellular network 120, while other devices with the same bootstrap IMSI may not be able to register with the same allocated bootstrap IMSI.

In an embodiment, multiple profiles can be defined in each eSIM, each of which may be configured with a bootstrap IMSI allocating connectivity through a separate carrier. In this embodiment, when a device is not able to connect to a network 130 with a first allocated bootstrap IMSI, the SIM applet is configured to initiate a connection through a second profile of a bootstrap IMSI. In this embodiment, the SIM applet can support more than one bootstrap IMSI profile for the purpose of redundancy. That is, each bootstrap IMSI profile may be set with an IMSI range. For example, a Profile 1 may be defined as an IMSI-X with range of Y and a Profile 2 may be defined as an IMSI-M with range of X (where Y is different from X). The SIM applet settings configuration may define the eSIM logic of which mechanism to use when a bootstrap IMSI fails to register to a network.

In a further embodiment, a device 120 may retain a first SIM profile identifier for initial connection and location reporting purposes, and may use a second SIM profile identifier for data connectivity over the network 130 of the local region. For example, each device may be equipped with a global ID, such as an IMSI number, used to identify the device with a unique worldwide identifier. However, a second identifier may be required to properly connect to a local network. Thus, a single device 120 may be configured to simultaneously connect to a central server as well as to a local network, using multiple eSIM interfaces, each with unique network parameters.

In an embodiment, the eSIM profile includes executable code, such as, but not limited to, a Java® applet. It should be noted that a Java® applet is just an example.

Figure 2:
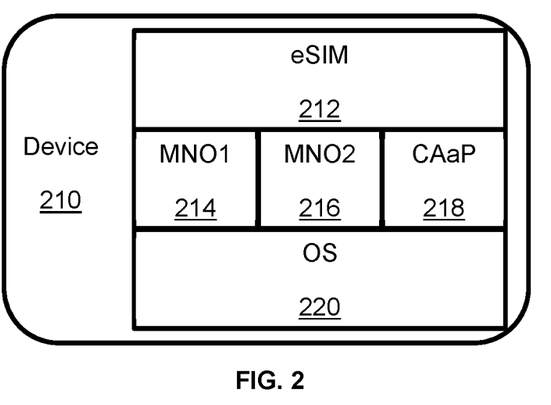
FIG. 2 is a schematic diagram of a device configured with an eSIM, according to an embodiment.

FIG. 2 is an example schematic diagram 200 of a device 210 installed with an eSIM 212, according to an embodiment.

The device 210 is a connected device including an eSIM 212. As examples and without limitation, the device 210 may be a cell phone, a tablet computer, an Internet of Things (IoT) device, a wearable device, and the like. An IoT device may vary from electrical appliances to environmental sensors, and other, like, devices. The eSIM 212 may be a discrete hardware component of the device 210, a virtualized component, or a hybrid physical-virtual element providing for one or more functions typical of a standard SIM or UICC module. The eSIM 212 may include, without limitation, data relating to a first mobile network operator (MNO-1) 214, data relating to a second MNO (MNO-2) 216, data related to a Custom Application as a Profile (CAaP) 218, and data relating to an operating system 220.

The first and second MNO data elements, MNO-1 214 and MNO-2 216, are data features describing the relationships between the eSIM 212 and the first and second mobile network operators including, without limitation, MNO names, addresses, permissions, and the like, as well as any combination thereof. In an embodiment, one or more MNO data elements may be included in an eSIM 212, including a single MNO element and three or more MNO elements.

The operating system 220 is a software feature embedded in the eSIM 212, configured to provide an execution environment for the various features described with respect to the MNO-1 214, MNO-2 216, and CAaP 218. In an embodiment, the operating system 220 may be an operating system such as, without limitation, Java® Card.

The CAaP 218 is a custom applet configured to provide one or more IMSI profiles based on one or more profile parameters received from external networks, and components thereof, from the control server, and components thereof, or both. The CAaP 218 may be configured as a single profile, or as an application, applet, or the like, configured to provide for enhanced SIM functionalities. Where the CAaP 218 is configured as an applet, or the like, the CAaP 218 may be configured to provide for control of business logic in multi-IMSI switching processes, providing for IMSI switching without a need to communicate with systems beyond the device 210.

Where the CAaP 218 is configured to provide for IMSI switching, the CAaP 218 may be configured to include one or more data entries including, without limitation, lists of IMSI profiles, IMSIs' respective security keys and business login rules, IMSI public land mobile networks (PLMNs), IMSI short message service centers (SMSCs), and the like, as well as any combination thereof. In an embodiment, the CAaP 218 may be configured to decide autonomously which IMSI profile, of the included list, to select. Further, in an embodiment, the CAaP 218 may be configured to update the custom control server with additional information including, without limitation, location, international mobile equipment identity (IMEI), and the like, as well as any combination thereof, for purposes including, without limitation, the application of backend business logic to override IMSI and operator use decisions, and the like, as well as any combination thereof.

Figure 3:
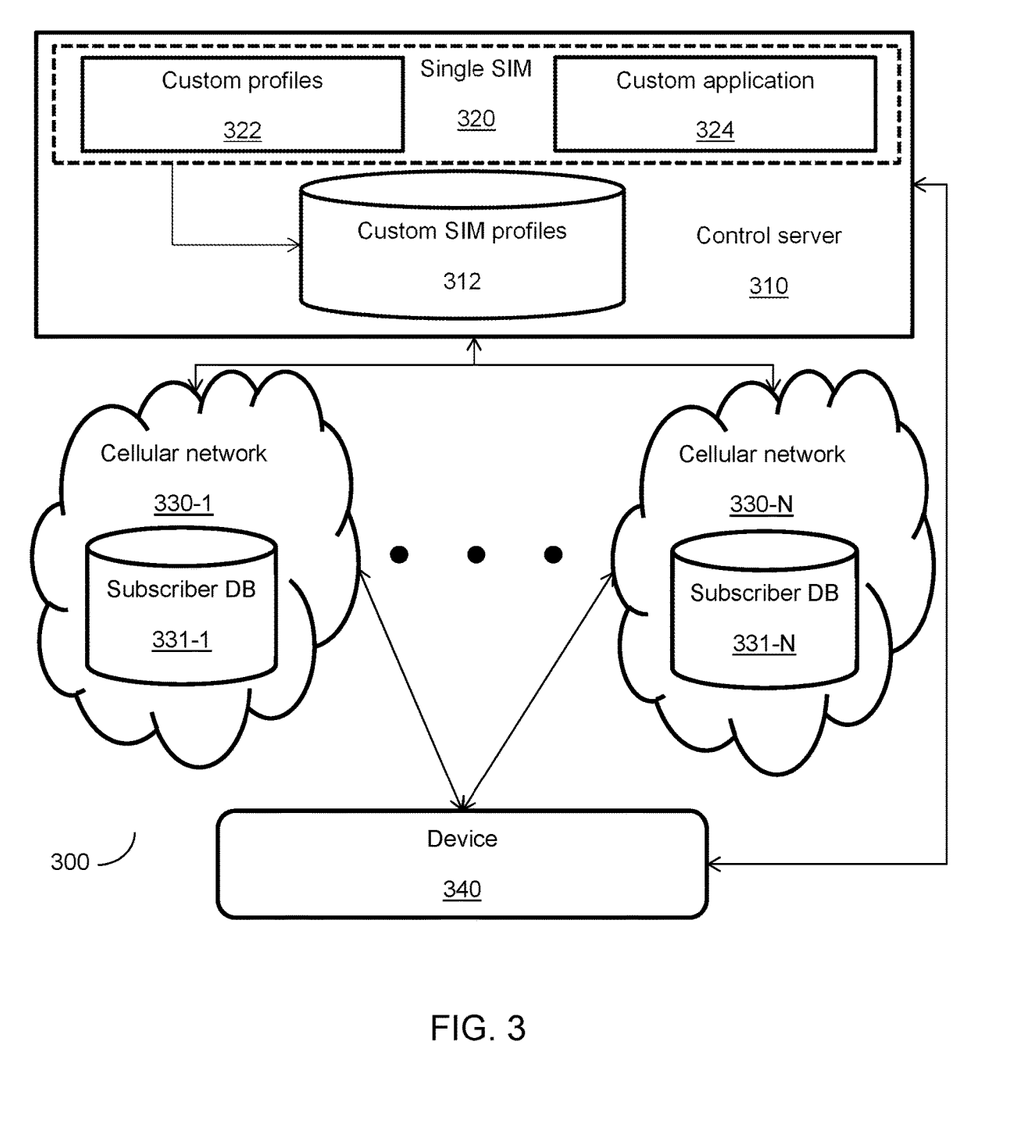
FIG. 3 is a block diagram depicting a set of relationships between a mobile network, a control server, and a device, according to an embodiment.

FIG. 3 is an example block diagram 300 depicting a set of relationships between a cellular network 330, a control server 310, and a device 340, according to an embodiment.

The control server 310 is configured to remotely provision an eSIM 345 installed in the device 340. The eSIM 345 (not shown) is configured to provide functionalities similar or identical to those provided by a traditional, physical SIM card. As noted above, an eSIM may be an iSIM, an eUICC, an enhanced SIM, and the like. The control server 310 may be configured to, without limitation, generate, store, provision, and otherwise manage one or more custom SIM profiles 312, as may be applicable to one or more devices 340. Custom SIM profiles 312 may be generated according to one or more pre-defined or user-defined methods, algorithms, and the like, based on data features including, without limitation, custom profiles 322, custom applications 324, and outputs thereof, as may be included in a single SIM 320.

The single SIM 320 may be a physical SIM, a virtual SIM, or a hybrid physical-virtual SIM, configured to store one or more custom profiles 322, custom applications 324, and the like, as well as any combination thereof. The custom profiles 322 may include one or more ISMI profiles, and the like, as well as any combination thereof.

The control server 310 may be configured to upload one or more custom profiles 312 to the subscriber database 331 of the cellular network or networks 330. In an embodiment, the control server 310 is configured to upload custom profiles to the subscriber database 331, the one or more custom profiles may be uploaded as standard eSIM profiles, and the like, as well as any combination thereof. The control server 310 may be configured to connect with the cellular networks 330 for purposes including management of, without limitation, ES2 data, ES4 data, ES2+ data, eSIM profiles, and the like, as well as other, like, purposes, and any combination thereof.

In addition, the control server 310 may be configured to connect directly to a device 340 for purposes including, without limitation, management of ES6 data, custom profiles, and the like, as well as other, like, purposes, and any combination thereof.

The cellular networks, 330-1 through 330-n, are networks configured to provide connectivity between one or more devices 340, control servers 310, and the like, as well as any combination thereof. The cellular networks 330 may include, without limitation, one or more subscriber databases 331, where such subscriber databases 331 may further include a subscription manager-data preparation (SM-DP) unit (not shown), a subscription management-secure routing (SM-SR) unit (not shown), as well as one or more memory or storage components providing for retention of data related to custom profiles generated by custom applications, mobile network operator (MNO) profiles, and the like.

SM-DP units may be configured to provide for execution of functions including, without limitation, preparation, storage, and protection of operator profiles, including operator credentials, download and installation of profiles onto an eSIM, other, like, functions, and any combination thereof. As described, SM-DP units may be configured to accept uploaded profiles, as may be uploaded from the control server 310, or various components thereof, as well as other, like, sources.

SM-SR units may be configured to provide for execution of various functions including, without limitation, management of eSIM profile statuses, including by execution of enabling, disabling, and deleting functions, and the like, as well as securing communications links between the eSIM and the SM-DP for the delivery of operator profiles, in addition to other, like, functions, and any combination thereof. Further, SM-SR units may be configured to push one or more custom profiles, such as the custom profiles 312, to an eSIM, where such profiles are specified by an MNO, including profiles which may be generated or otherwise managed by a control server 310 and uploaded to a connected SM-SR.

Further, in an embodiment, SM-DP units may be configured as SM-DP+ units, wherein such a configuration may incorporate execution of functions typical of both SM-DP and the SM-SR units.

The cellular networks 330 may be connected to a device 340 via one or more wired or wireless means, as well as any combination thereof, for execution of functions including, without limitation, profile push processes, as described with respect to SM-SR units, other, like, functions, and any combination thereof.

The device 340 is a connected device, including an eSIM. The device 340, its various included elements, and the functionalities thereof, are described in detail with respect to FIG. 2, above.

Figure 4:
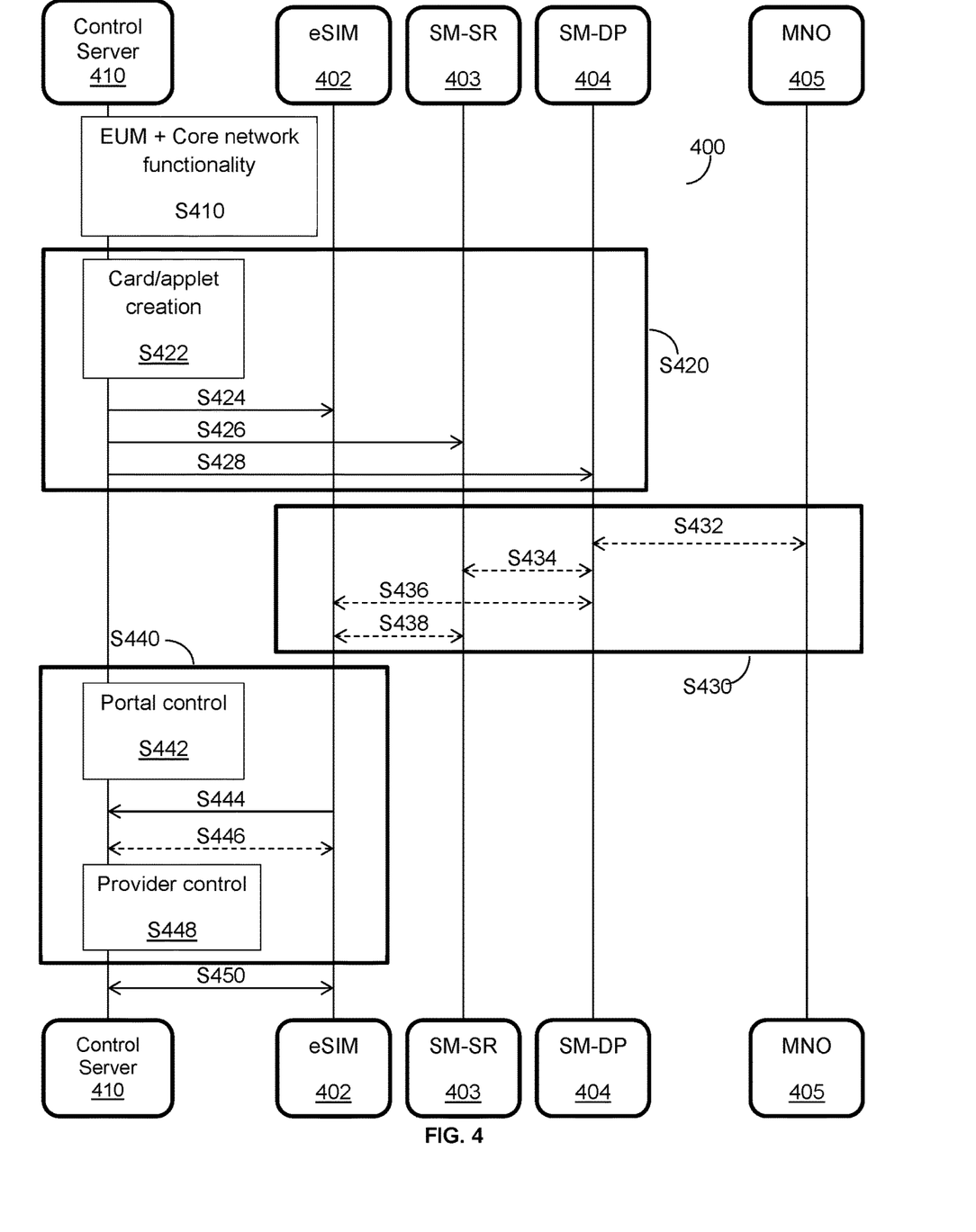
FIG. 4 is a flow diagram depicting a process for provisioning a new eSIM card with an enhanced SIM profile, according to an embodiment.

FIG. 4 is an example flow diagram 400 depicting a process for provisioning a new eSIM with an enhanced SIM profile, according to an embodiment. An eSIM is defined above to include any type of eUICC, iSIM, and the like. The diagram 400 describes the process control and data flow between a control server 410, an eSIM 402, an SM-SR 403, an SM-DP 404, and an MNO 405. The process for provisioning a new eSIM in a device is performed by the control server 410. FIG. 4 shows the elements controlled by the server 410 during the provisioning process. Such control can be achieved using an API, a control message (send via, e.g., USSR), and the like.

At S410, eUICC manufacturer (EUM) and core network functionalities are initiated.

At S420, an eSIM card with a single enhanced SIM profile is created on a connected device. In an embodiment, S420 includes creating or otherwise instantiating an applet (S422). An applet is a piece of code which, when executed, can control the activation of the eSIM and any profile configured therein. In an example embodiment, the applet may be a Java® applet. S420 may further include, at S424, uploading or pushing various card personalization data to the eSIM 402. The card personalization data includes, without limitation, a card identifier (eID), an integrated circuit card identifier (ICCID), and the like, as well as any combination thereof. At S426, the card personalization data (such as eID, ICCID, and the like) are uploaded to the SM-SR 403. At S428, the profile ICCID and profile type is pushed to the SM-DP 404.

At S430, subscription management data exchanged is initiated. In an embodiment, S430 includes, at S432, causing the MNO to initiate eSIM profile changes, during which data is exchanged between the SM-DP 404 and the MNO 405. S432 may be performed through an ES2 command and interface defined for eUICCs provisioning. At S434, a link is established, and data is exchanged between the SM-SR 403 and the SM-DP 404. S434 may be performed using ES3 commands and interface defined for eUICCs provisioning. At S436, data is exchanged between the eSIM 402 and the SM-DP 404. Profile management data at S346 may be exchanged using both ES8 commands and interface defined for eUICCs provisioning. The ES8 defines certain functions for profile management. At S438, platform management and/or eSIM management data is exchanged between the eSIM 402 and the SM-SR 403. The data exchange at S438 can be performed using ES5 commands and interface defined for eUICCs provisioning.

It should be noted that, in order to change an eSIM profile from one MNO to another, the MNO 405 may be configured to initiate the communication toward the SM-DP module 404 using an eSIM mobile station international subscriber directory number (MSISDN). The eSIM may be loaded with multi-IMSI profiles, the MSISDN is not changed when the IMSI profile changes, according to the disclosed embodiments.

At S440, an applet bootstrap control is initiated, thereby causing the restart of the eSIM. The initiation may be performed using a portal user interface (UI), application programming interface (API), a text message, and the like. At S444, upon the eSIM 402 restart, a location update is collected or pulled from the eSIM 402. At S446, core network signaling data is exchanged between the control server 410 and the eSIM 402. At S448, control of the server over the eSIM is initiated.

At S450, an over-the-air (OTA) configuration of eSIM is performed. This includes populating the eSIM with at least multi-IMSI profiles, and management of multi-IMSI profile actions. The actions may include pushing new IMSIs and keys, switching IMSIs, deleting IMSIs, setting card settings, and the like, as well as any combination thereof. The OTA may be exchanged using over a secured channel created using ES6 commands and interface defined for eUICCs provisioning.

Figure 5:
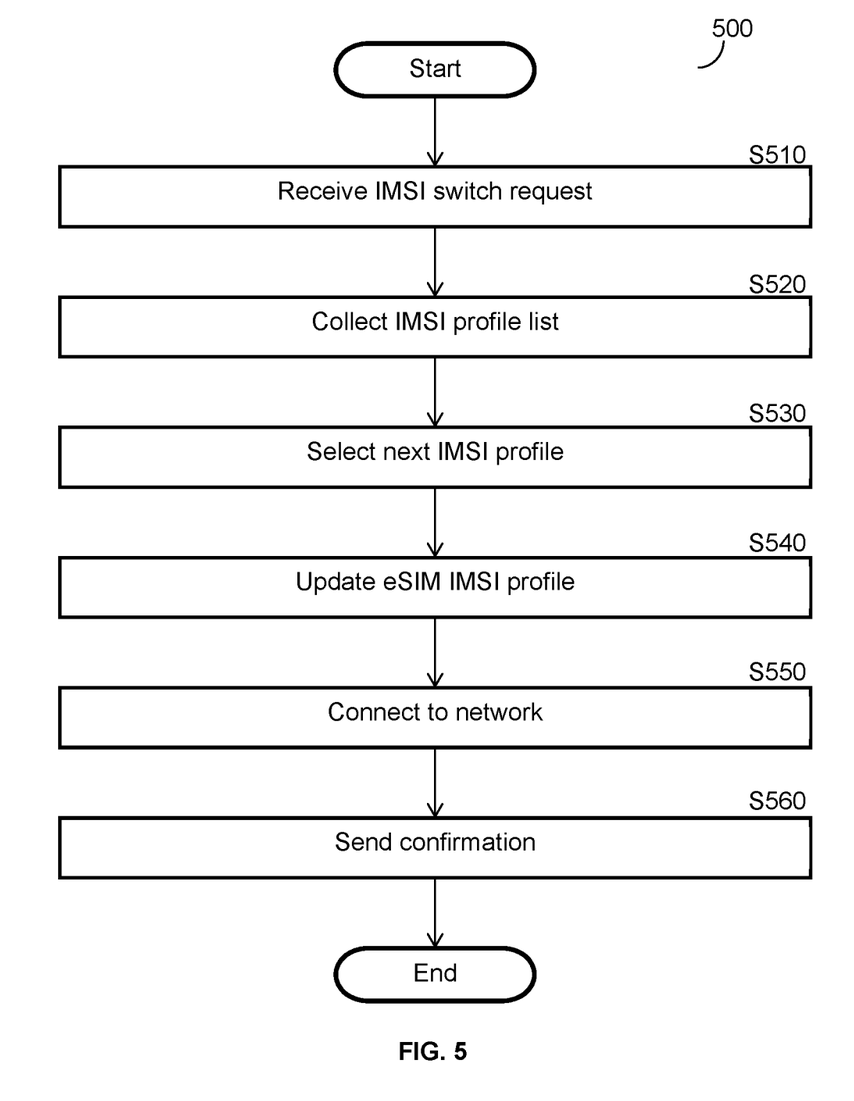
FIG. 5 is a flowchart depicting a method for multi-IMSI switching, according to an embodiment.

FIG. 5 is an example flowchart 500 depicting a method for multi-IMSI switching, according to an embodiment. The method described with respect to FIG. 5 may be executed by an eSIM applet, as may be included in an eSIM, where such an eSIM may further be included in a device, as described hereinabove.

At S510, an IMSI switch request is received. An IMSI switch request is an instruction, command, request, or other, similar data feature, specifying a transition of eSIM operation from a first IMSI profile to a second IMSI profile. The IMSI switch request may be received from one or more sources including, without limitation, the device hosting the eSIM which includes the eSIM applet, a control server, such as the control server, 310, of FIG. 3, above, a cellular network, such as the cellular networks, 330, of FIG. 3, above, other, like, sources, and any combination thereof. The IMSI switch request may include one or more IMSI profile parameters or related data features including, without limitation, desired IMSI profile identifiers, IMSI security keys and business login rules, IMSI public land mobile networks (PLMNs), IMSI short message service centers (SMSCs), and the like, as well as any combination thereof. Further, the IMSI switch request may include one or more IMSI switch parameter specifications including, without limitation, IMSI switch deadlines or schedules, IMSI switch trigger conditions, IMSI switch verification or authentication features, and the like, as well as any combination thereof.

At S520, an IMSI profile list is collected. The IMSI profile list is a list, table, or other, like, structure, populated with one or more IMSI profiles, including profile parameters for the various profiles. The IMSI profile list may be collected from one or more sources including, without limitation, memory, or storage components of the eSIM which includes the eSIM applet, memory, or storage components of the device, which includes the same eSIM, various cellular networks, as described hereinabove, various control servers, as described hereinabove, and the like, as well as any combination thereof.

At S530, a subsequent IMSI profile is selected. A subsequent IMSI profile may be selected from one or more sources including, without limitation, the IMSI profile list collected at S520, data included in the IMSI switch request received at S510, other, like, sources, and any combination thereof. A subsequent IMSI profile may be selected based on one or more factors including, without limitation, profile specifications included in the switch request received at S510, optimization preferences, where such optimization preferences may be pre-defined or user-defined and may be configured to, as examples and without limitation, minimize communication latency, select preferred MNOs over other MNOs, and the like, in addition to other, like, factors, and any combination thereof. In an embodiment, where an eSIM is configured to provide for multiple, concurrent IMSI profiles, S530 may include selection of one or more subsequent IMSI profiles.

At S540, the eSIM IMSI profile is updated. Updating the eSIM IMSI profile at S540 may include execution of functions including, without limitation, "flashing" one or more storage or memory components of the eSIM, or device in which the eSIM is included, replacing current IMSI profile parameters with profile parameters of the IMSI profile selected at S530, initiating reset or restart procedures for the eSIM, the device, or both, as well as other, like, functions, and any combination thereof.

At S550, connection to a network is established. The network connection established at S550 may be a connection established using the new IMSI profile or profiles, as selected at S530 and updated at S540. The network connection established at S550 may be a connection to a cellular network to which the given device or eSIM was previously connected, or a connection to a new cellular network to which the given device or eSIM was not previously connected. In an embodiment, the network connection established at S550 may be a connection to a cellular network, wherein the cellular network may be automatically-selected based on one or more factors including, without limitation, preference for specific MNOs, minimization of connection latency, and the like, as well as any combination thereof. In a further embodiment, the connection established at S550 may be a connection to a cellular network, wherein the cellular network may be pre-specified or user-specified, including cellular networks specified in the IMSI switch request received at S510.

At an optional S560, confirmation of IMSI switch is sent to a control server. Data included in a confirmation sent at S560 may include, without limitation, device or eSIM location, international mobile equipment identity (IMEI), and the like, as well as any combination thereof, for purposes including, without limitation, application of backend business logic to override IMSI and operator use decisions, and the like, as well as any combination thereof.

The disclosed embodiments have been discussed with reference to specific examples of a profile defined with one or more SIM. However, one of ordinary skill would recognize that the embodiments, disclosed herein, are also applicable when utilizing iSIMs, soft SIMs, eSIMs, SIM cards, and the like.

The embodiments disclosed herein can be performed by a SIM applet configured with the device. The device may be an IoT device, a mobile device, a smartphone, or any device that allows connectivity over a cellular network. The SIM applet may be realized as computer-readable instructions such as software, firmware, or a combination thereof executed by hardware circuitry. The circuitry may include a processor or a controller and a memory. The memory may be volatile, non-volatile, or a combination thereof. In one configuration, computer-readable instructions to implement one or more embodiments disclosed herein may be stored in a storage component. In another configuration, a memory component is configured to store such software.

It should be noted that the computer-readable instructions may be construed broadly to mean any type of instructions, whether referred to as software, firmware, middleware, microcode, hardware description language, or otherwise. Instructions may include code, such as in source code format, binary code format, executable code format, or any other suitable format of code. The instructions, when executed by the circuitry, cause the circuitry to perform the various processes described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination. All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for provisioning an embedded SIM (eSIM) with an enhanced SIM profile, comprising:
    creating an eSIM card with a single enhanced SIM profile on a connected device, wherein the created eSIM includes therein at least an operating system and an applet that is distinct from and executable on top of the operating system;
    initiating a subscription management data exchange between the eSIM card and at least one component of a cellular network;
    initiating a bootstrap control of the applet to restart the eSIM; and
    configuring the eSIM with a plurality of multi-international mobile subscriber identity (multi-IMSI) profiles and actions related to IMSI profiles, wherein the configuration is performed using over-the-air (OTA) configuration, thereby configuring the enhanced SIM profile with a plurality of IMSI profiles.

2. The method of claim 1, wherein creating the eSIM card with the single enhanced SIM profile further comprises:
    providing the eSIM with a personalized card identifier
    providing a subscription management-secure routing (SM-SR) with the personalized card identifier; and
    providing a subscription manager-data preparation (SM-DP) with a profile identifier and at least a profile type.

3. The method of claim 2, wherein the SM-SR and the SM-DP are components of the cellular network.

4. The method of claim 2, wherein the personalized card identifier is at least one of: a card identifier (eID) and an Integrated Circuit Card Identifier (ICCID).

5. The method of claim 1, wherein initiating a subscription management data exchange between the eSIM card, causes at least eSIM profile change.

6. The method of claim 1, wherein the subscription management data exchange between the eSIM card and various components of the cellular network, is performed utilizing commands and interfaces defined for the eSIM.

7. The method of claim 1, wherein initiating the bootstrap control of the applet to restart the eSIM further comprises:
    collecting at least a location update;
    exchanging at least core network signaling data; and
    providing a remote server with a control over the eSIM.

8. The method of claim 1, further comprising:
    switching between the plurality of multi-IMSI profiles, wherein each of the plurality of multi-IMSI profiles allows connection to a different service provider of a cellular network.

9. The method of claim 8, further comprising:
receiving a request to switch from a first IMSI profile to a second IMSI profile defined in the plurality of multi-IMSI profiles;
selecting the second IMSI profile from a list storing the plurality of IMSI profiles in the eSIM;
executing a command by the applet to replace the first IMSI profile with the second profile;
restarting the eSIM with the second IMSI profile; and
establishing a connection to a cellular network using the second IMSI profile.

10. The method of claim 9, wherein the switching of multi-IMSI profiles is performed under the control of a remote server.

11. A non-transitory computer readable medium having stored thereon causing a processing circuitry to execute a process, the process comprising:
creating an eSIM card with a single enhanced SIM profile on a connected device, wherein the created eSIM includes therein at least an operating system and an applet that is distinct from and executable on top of the operating system;
initiating a subscription management data exchange between the eSIM card and at least one component of a cellular network;
initiating a bootstrap control of the applet to restart the eSIM; and
configuring the eSIM with a plurality of multi-international mobile subscriber identity (multi-IMSI) profiles and actions related to IMSI profiles, wherein the configuration is performed using over-the-air (OTA) configuration, thereby configuring the enhanced SIM profile with a plurality of IMSI profiles.

12. A system for provisioning an embedded SIM (eSIM) with an enhanced SIM profile, comprises:
a processing circuitry; and
a memory, the memory containing instructions that, when executed by the processing circuitry, configure the system to:
create an eSIM card with a single enhanced SIM profile on a connected device, wherein the created eSIM includes therein at least an operating system and an applet that is distinct from and executable on top of the operating system;
initiate a subscription management data exchange between the eSIM card and at least one component of a cellular network;
initiate a bootstrap control of the applet to restart the eSIM; and
configure the eSIM with a plurality of multi-international mobile subscriber identity (multi-IMSI) profiles and actions related to IMSI profiles, wherein the configuration is performed using over-the-air (OTA) configuration, thereby configuring the enhanced SIM profile with a plurality of IMSI profiles.

13. The system of claim 12, wherein the system is further configured to:
provide the eSIM with a personalized card identifier
provide a subscription management-secure routing (SM-SR) with the personalized card identifier; and
provide a subscription manager-data preparation (SM-DP) with a profile identifier and at least a profile type.

14. The system of claim 13, wherein the SM-SR and the SM-DP are components of the cellular network.

15. The system of claim 13, wherein the personalized card identifier is at least one of: a card identifier (eID) and an Integrated Circuit Card Identifier (ICCID).

16. The system of claim 12, wherein initiation of a subscription management data exchange between the eSIM card, causes at least eSIM profile change.

17. The system of claim 12, wherein the subscription management data exchange between the eSIM card and various components of the cellular network, is performed utilizing commands and interfaces defined for the eSIM.

18. The system of claim 12, wherein the system is further configured to:
collect at least a location update;
exchange at least core network signaling data; and
provide a remote server with a control over the eSIM.

19. The system of claim 12, wherein the system is further configured to:
switch between the plurality of multi-IMSI profiles, wherein each of the plurality of multi-IMSI profiles allows connection to a different service provider of a cellular network.

20. The system of claim 19, wherein the system is further configured to:
receive a request to switch from a first IMSI profile to a second IMSI profile defined in the plurality of multi-IMSI profiles;
select the second IMSI profile from a list storing the plurality of IMSI profiles in the eSIM;
execute a command by the applet to replace the first IMSI profile with the second profile;
restart the eSIM with the second IMSI profile; and
establish a connection to a cellular network using the second IMSI profile.

21. The system of claim 20, wherein the switching of multi-IMSI profiles is performed under the control of a remote server.

* * * * *